US012580672B2

(12) United States Patent
Kelly et al.

(10) Patent No.: US 12,580,672 B2
(45) Date of Patent: Mar. 17, 2026

(54) PHOTONIC INTEGRATED CIRCUIT AND OPTO-ELECTRONIC SYSTEM COMPRISING THE SAME

(71) Applicant: EFFECT Photonics B.V., Eindhoven (NL)

(72) Inventors: Niall Patrick Kelly, Eindhoven (NL); Tim Koene, Utrecht (NL); Emil Kleijn, Son en Breugel (NL)

(73) Assignee: EFFECT PHOTONICS B.V., Eindhoven (NL)

( * ) Notice: Subject to any disclaimer, the term of this patent is extended or adjusted under 35 U.S.C. 154(b) by 312 days.

(21) Appl. No.: 18/115,916

(22) Filed: Mar. 1, 2023

(65) Prior Publication Data

US 2023/0283394 A1     Sep. 7, 2023

(30) Foreign Application Priority Data

Mar. 3, 2022     (EP) ..................................... 22160056

(51) Int. Cl.
| | |
|---|---|
| *H04B 10/60* | (2013.01) |
| *H04J 14/02* | (2006.01) |
| *H04B 10/61* | (2013.01) |

(52) U.S. Cl.
CPC ...... *H04J 14/0204* (2013.01); *H04J 14/0282* (2013.01); *H04B 10/60* (2013.01);
(Continued)

(58) Field of Classification Search
CPC .............. H04J 14/0204; H04J 14/0282; H04B 10/6151; H04B 10/614; H04B 10/60;
(Continued)

(56) References Cited

U.S. PATENT DOCUMENTS

| | | | |
|---|---|---|---|
| 5,060,312 A | 10/1991 | Delavaux | |
| 10,741,591 B2 * | 8/2020 | Yagi ................... | G02B 6/12004 |

(Continued)

FOREIGN PATENT DOCUMENTS

| | | |
|---|---|---|
| CN | 104467981 A | 3/2015 |
| CN | 110794513 A | 2/2020 |

(Continued)

OTHER PUBLICATIONS

Itoh et al, Heterogeneous integration of InP PDs on silica-based PLCs, Jun. 2013, OFC/NFOEC, All Document. (Year: 2013).*

(Continued)

*Primary Examiner* — Dibson J Sanchez
(74) *Attorney, Agent, or Firm* — Hudak, Shunk & Farine Co. LPA

(57) ABSTRACT

A PIC having at least three fiber-to-chip coupling locations, an InP-based polarization handling unit, at least two optical splitter-combiners, at least two optical receivers, and a plurality of semiconductor-based optical waveguides. The plurality of semiconductor-based optical waveguides are configured and arranged to optically connect a first fiber-to-chip coupling location with a first optical receiver via a first optical splitter-combiner, a second fiber-to-chip coupling location with the at least two optical receivers via the InP-based polarization handling unit and the at least two optical splitter-combiners, and a third fiber-to-chip coupling location with a second optical receiver via a second optical splitter-combiner. An opto-electronic system including said PIC.

15 Claims, 9 Drawing Sheets

(52) U.S. Cl.
   CPC ............ *H04B 10/61* (2013.01); *H04B 10/614* (2013.01); *H04B 10/615* (2013.01); *H04B 10/6151* (2013.01)

(58) Field of Classification Search
   CPC ...... H04B 10/61; H04B 10/615; G02B 6/126; G02B 6/4204; G02B 6/4213
   USPC .................................. 398/43–103, 202–214
   See application file for complete search history.

(56) References Cited

U.S. PATENT DOCUMENTS

| | | | | |
|---|---|---|---|---|
| 10,979,148 | B1 * | 4/2021 | Zhou ........................ | H04J 14/06 |
| 2007/0140613 | A1 | 6/2007 | Achiam et al. | |
| 2011/0142457 | A1 * | 6/2011 | Betty .................... | G02B 6/4293 385/14 |
| 2012/0106984 | A1 * | 5/2012 | Jones ..................... | H04B 10/60 398/214 |
| 2012/0207474 | A1 * | 8/2012 | Inoue ................... | H04B 10/613 359/325 |
| 2012/0224812 | A1 | 9/2012 | Inoue et al. | |
| 2012/0230631 | A1 * | 9/2012 | Jeong ................. | G02B 6/12004 385/24 |
| 2013/0129273 | A1 * | 5/2013 | Nara ....................... | G02B 6/126 385/11 |
| 2014/0086595 | A1 * | 3/2014 | Yamazaki .............. | G02B 6/125 156/280 |
| 2014/0348517 | A1 * | 11/2014 | Shibata ................ | G02B 6/4286 398/214 |
| 2016/0285561 | A1 * | 9/2016 | Wu ....................... | H04B 10/613 |
| 2018/0143376 | A1 * | 5/2018 | Kamei ...................... | G02F 2/00 |
| 2018/0364426 | A1 | 12/2018 | Ten Have et al. | |
| 2019/0196097 | A1 * | 6/2019 | Takechi ................. | G02B 6/126 |
| 2020/0044739 | A1 | 2/2020 | Sugiyama | |
| 2021/0201126 | A1 | 7/2021 | Meng et al. | |
| 2021/0242268 | A1 | 8/2021 | Yagi et al. | |

FOREIGN PATENT DOCUMENTS

| | | |
|---|---|---|
| CN | 113496281 A | 10/2021 |
| CN | 114063045 A | 2/2022 |
| JP | H0715386 A | 1/1995 |
| JP | 2021120695 A | 8/2021 |
| WO | 2011027883 A1 | 2/2013 |

OTHER PUBLICATIONS

Japanese Office Action mailed Jan. 23, 2024 for family member Application No. 2023-031530.

Hu, T., High-yield Manufacturing of InP Dual-Port Coherent Receiver Photonic Integrated Circuits for 100G PDM-QPSK Application, 23rd Inter'l Conference on Indium Phosphide and Related Materials, IPRM May 22-26, 2011, Berlin Germany, ISBN 978-3-8007-3356-9, VDE Verlag GmbH, Berlin.

Kurata, Y., Heterogeneously Integrated PLC With Low-Loss Spot-Size Converter and Newly Developed Waveplate PBS for DC-DP-16QAM Receiver, Journal of Lightwave Tech., Mar. 15, 2015, pp. 1202-1209, vol. 33, No. 6, IEEE.

Taiwanese Office Action dated Aug. 1, 2024 for family member Application No. 112107584.

Search Report for corresponding Chinese Application 2023102058487 dated Jul. 22, 2025.

* cited by examiner

Fig. 1

PHOTONIC INTEGRATED CIRCUIT AND OPTO-ELECTRONIC SYSTEM COMPRISING THE SAME

FIELD OF THE INVENTION

The present invention relates to a photonic integrated circuit (PIC) that can be used for example, but not exclusively, for telecommunication applications, Light Detection and Ranging (LIDAR) or sensor applications. The invention further relates to an opto-electronic system comprising said PIC.

BACKGROUND OF THE INVENTION

PICs that can be applied for example, but not exclusively, in the field of optical telecommunication applications, LIDAR or sensor applications are becoming increasingly complex because of the increasing number of optical and/or electrical functions that are integrated on a single die that preferably has a footprint that is as small as possible.

An example of increasingly complex PICs is a PIC that can be used for coherent reception. It is known that coherent transmission involves encoding of information on two optical carriers by modulating their amplitude and phase. Two polarizations, i.e. transverse magnetic (TM) and transverse electric (TE), are commonly used to prevent said optical carriers from interfering with each other as they propagate along a same optical pathway that can be formed by for example an optical fiber or an integrated optical waveguide. Separation of TM and TE modes in a received optical signal is required for recovering the encoded information. An optical receiver can separate the TM and TE modes in the received optical signal if it is configured as a coherent receiver or if a modulation format is used involving amplitude modulation.

The most versatile technology platform for PICs, especially for optical telecommunication applications, uses wafers comprising InP-based semiconductor materials. InP-based technology enables monolithic integration of both active components such as for example light-generating and/or light-absorbing optical devices, and passive components such as for example light-guiding and/or light-switching optical devices, in one PIC on a single die.

It is known that most InP-based PICs are optimized for handling TE modes due to the confined nature of quantum wells. Therefore, in the case of for example coherent reception, it is common practice to split TM and TE modes and subsequently rotate or convert TM modes into TE modes. A polarization splitter device is commonly used for splitting the TM and TE modes, and a polarization rotator device is commonly used for subsequently rotating or converting TM modes into TE modes.

A known disadvantage of highly complex PICs, in particular those comprising at least one of an InP-based polarization splitter and an InP-based polarization rotator is that it is very challenging to achieve suitable chip yields because of the high fabrication complexity and sensitivity of the afore-mentioned components and the fact that CMOS levels of process control are not yet widely available for InP-based platforms. Therefore, there is a need for providing a PIC comprising an InP-based polarization splitter and an InP-based polarization rotator enabling improved chip yield due to an improved design of the PIC.

SUMMARY OF THE INVENTION

It is an object of the present invention to provide a PIC comprising an InP-based polarization splitter and an InP-based polarization rotator that can be used for example, but not exclusively, for telecommunication applications, LIDAR or sensor applications, pre-empting or at least reducing at least one of the above-mentioned and/or other disadvantages associated with PICs comprising an InP-based polarization splitter and an InP-based polarization rotator known in the art.

It is also an object of the present invention to provide an opto-electronic system that can be used for example, but not exclusively, for telecommunication applications, LIDAR or sensor applications comprising a PIC according to the invention.

Aspects of the present invention are set out in the accompanying independent and dependent claims. Features from the dependent claims may be combined with features from the independent claim as appropriate and not merely as explicitly set out in the claims. Furthermore, all features may be replaced with other technically equivalent features.

At least one of the abovementioned objects is achieved by a PIC comprising:
- at least three fiber-to-chip coupling locations;
- an InP-based polarization handling unit;
- at least two optical splitter-combiners;
- at least two optical receivers; and
- a plurality of semiconductor-based optical waveguides;

wherein the plurality of semiconductor-based optical waveguides are configured and arranged to optically connect:
- a first fiber-to-chip coupling location of the at least three fiber-to-chip coupling locations with a first optical receiver of the at least two optical receivers via a first optical splitter-combiner of the at least two optical splitter-combiners;
- a second fiber-to-chip coupling location of the at least three fiber-to-chip coupling locations with the at least two optical receivers via the InP-based polarization handling unit and the at least two optical splitter-combiners; and
- a third fiber-to-chip coupling location of the at least three fiber-to-chip coupling locations with a second optical receiver of the at least two optical receivers via a second optical splitter-combiner of the at least two optical splitter-combiners.

The above-defined embodiment of the PIC according to the invention has an improved design that enables bypassing the on-chip InP-based polarization handling unit and using off-chip polarization handling components and/or systems instead. The off-chip polarization handling components and/or systems can be optically connected with the PIC at the first fiber-to-chip coupling location and/or the third fiber-to-chip coupling location of the at least three fiber-to-chip coupling locations. The compatibility of the PIC according to the invention with off-chip polarization handling components and/or systems can be advantageous if the on-chip InP-based polarization handling unit of the PIC has off-spec polarization handling performance, i.e. polarization handling performance that is not within a desired specification. As a result, instead of having to scrap a PIC due to off-spec performance of the on-chip InP-based polarization handling unit, the PIC according to the present invention can still be applied in modules or opto-electronic systems that use off-chip polarization handling components and/or systems. Therefore, as a result of the improved design of the PIC according to the invention, improved chip yields can be achieved.

Different exemplary use cases of the above-defined embodiment of the PIC according to the invention can be envisaged. In accordance with a first exemplary use case, the on-chip polarization handling capability of the PIC according to the invention can be fully used by launching optical radiation comprising both TM and TE modes into the PIC via the second fiber-to-chip coupling location of the at least three fiber-to-chip coupling locations that is optically connected with the on-chip InP-based polarization handling unit via a semiconductor-based optical waveguide. Firstly, the on-chip InP-based polarization handling unit separates the TM and TE modes of the received optical radiation. Secondly, the on-chip InP-based polarization handling unit rotates the TM mode to obtain a converted TE mode. Subsequently, the TE mode and the converted TE mode can be guided to different optical receivers of the at least two optical receivers via semiconductor-based optical waveguides of the plurality of semiconductor-based optical waveguides. The above-described first exemplary use case represents the lowest cost, lowest performance but fully on-chip polarization handling solution offered by the PIC according to the invention.

In accordance with a third exemplary use case of the PIC according to the invention, a polarization splitter of the on-chip InP-based polarization handling unit can be bypassed if the performance of the on-chip polarization splitter is off-spec. The on-chip polarization splitter can be bypassed by launching optical radiation comprising the TM mode that has been separated from the TE mode by an off-chip polarization splitter into the PIC via the first fiber-to-chip coupling location of the at least three fiber-to-chip coupling locations, and by launching optical radiation comprising the TE mode into the PIC via the third fiber-to-chip coupling location of the at least three fiber-to-chip coupling locations. The TM mode can be guided to a polarization rotator of the on-chip InP-based polarization handling unit via a first optical splitter-combiner of the at least two optical splitter-combiners and semiconductor-based optical waveguides of the plurality of semiconductor-based optical waveguides. The polarization rotator of the on-chip InP-based polarization handling unit can rotate the TM mode to obtain a converted TE mode. Subsequently, the converted TE mode can be guided to a first optical receiver of the at least two optical receivers via a semiconductor-based optical waveguide of the plurality of semiconductor-based optical waveguides. The TE mode that is launched into the PIC via the third fiber-to-chip coupling location can be guided to a second optical receiver of the at least two optical receivers via a second optical spitter-combiner of the at least two optical splitter-combiners and semiconductor-based optical waveguides of the plurality of semiconductor-based optical waveguides. In comparison with the above-described fully on-chip polarization handling solution offered by the PIC according to the invention, the third exemplary use case represents a higher cost, higher performance hybrid polarization handling solution offered by the PIC according to the invention.

In accordance with a second exemplary use case of the PIC according to the invention, the on-chip InP-based polarization handling unit can be completely bypassed if the performances of both the on-chip polarization splitter and the on-chip polarization rotator are off-spec. In that case, polarization splitting and polarization rotation are performed completely by off-chip arranged components and/or systems. The off-chip separated and converted TE mode can be launched into the PIC via the first fiber-to-chip coupling location of the at least three fiber-to-chip coupling locations and guided to the first optical receiver of the at least two optical receivers via the first optical splitter-combiner of the at least two optical splitter-combiners and semiconductor-based optical waveguides of the plurality of semiconductor-based optical waveguides. The off-chip separated TE mode can be launched into the PIC via the third fiber-to-chip coupling location of the at least three fiber-to-chip coupling locations and guided to the second optical receiver of the at least two optical receivers via the second optical splitter-combiner of the at least two optical splitter-combiners and semiconductor-based optical waveguides of the plurality of semiconductor-based optical waveguides. In comparison with the above-described fully on-chip and hybrid polarization handling solutions offered by the PIC according to the invention, the second exemplary use case represents the highest cost, highest performance fully off-chip polarization handling solution offered by the PIC according to the invention.

The person skilled in the art will appreciate that any suitable number of fiber-to-chip coupling locations of three and higher, any suitable number of InP-based polarization handling units of one and higher, any suitable number of optical splitter-combiners of two and higher, any suitable number of optical receivers of two and higher, and any suitable number of semiconductor-based optical waveguides can be envisaged depending on the specific requirements for the PIC.

In an embodiment of the PIC according to the invention,
the first optical receiver of the at least two optical receivers has a first optical input port;
the second optical receiver of the at least two optical receivers has a second optical input port;
the first optical splitter-combiner has:
a first end part that is provided with at least a first optical interface and a second optical interface; and
a second end part that is provided with at least a third optical interface;
the second optical splitter-combiner has:
a third end part that is provided with at least a fourth optical interface and a fifth optical interface; and
a fourth end part that is provided with at least a sixth optical interface;
the InP-based polarization handling unit comprises a combined InP-based polarization splitter and rotator device having a third optical input port, a first optical output port and a second optical output port; and
the plurality of semiconductor-based optical waveguides comprises:
a first semiconductor-based optical waveguide that is arranged to optically connect the first fiber-to-chip coupling location of the at least three fiber-to-chip coupling locations with the first optical interface of the first optical splitter-combiner;
a second semiconductor-based optical waveguide that is arranged to optically connect the second fiber-to-chip coupling location of the at least three fiber-to-chip coupling locations with the third optical input port of the combined InP-based polarization splitter and rotator device;
a third semiconductor-based optical waveguide that is arranged to optically connect the third fiber-to-chip coupling location of the at least three fiber-to-chip coupling locations with the fourth optical interface of the second optical splitter-combiner;
a fourth semiconductor-based optical waveguide that is arranged to optically connect the first optical output port of the combined InP-based polarization splitter and rotator device with the second optical interface of the first optical splitter-combiner;

a fifth semiconductor-based optical waveguide that is arranged to optically connect the second optical output port of the combined InP-based polarization splitter and rotator device with the fifth optical interface of the second optical splitter-combiner;

a sixth semiconductor-based optical waveguide that is arranged to optically connect the third optical interface of the first optical splitter-combiner with the first optical input port of the first optical receiver; and a seventh semiconductor-based optical waveguide that is arranged to optically connect the sixth optical interface of the second optical splitter-combiner with the second optical input port of the second optical receiver.

The above-defined embodiment of the PIC according to the invention can be operated in accordance with the above-described first and second exemplary use cases. Operating the above-defined embodiment of the PIC in accordance with the above-described third exemplary use case that provides a hybrid polarization handling solution is not possible because on the one hand the first optical splitter-combiner is arranged between the combined InP-based polarization splitter and rotator device of the on-chip InP-based polarization handling unit and the first optical receiver, and on the other hand the second optical splitter-combiner is arranged between the combined InP-based polarization splitter and rotator device of the on-chip InP-based polarization handling unit and the second optical receiver.

The person skilled in the art will appreciate that any suitable number of fiber-to-chip coupling locations of three and higher, any suitable number of combined InP-based polarization splitter and rotator devices of one and higher, any suitable number of optical splitter-combiners of two and higher, any suitable number of optical receivers of two and higher, and any suitable number of semiconductor-based optical waveguides can be envisaged depending on the specific requirements for the PIC.

In an embodiment of the PIC according to the invention, the first optical receiver of the at least two optical receivers has a first optical input port;

the second optical receiver of the at least two optical receivers has a second optical input port;

the first optical splitter-combiner has:

a first end part that is provided with at least a first optical interface and a second optical interface; and a second end part that is provided with at least a third optical interface;

the second optical splitter-combiner has:

a third end part that is provided with at least a fourth optical interface and a fifth optical interface; and a fourth end part that is provided with at least a sixth optical interface;

the InP-based polarization handling unit comprises:

an InP-based polarization splitter having a fourth optical input port, a third optical output port, and a fourth optical output port; and an InP-based polarization rotator having a fifth optical input port and a fifth optical output port; and the plurality of semiconductor-based optical waveguides comprises:

a first semiconductor-based optical waveguide that is arranged to optically connect the first fiber-to-chip coupling location of the at least three fiber-to-chip coupling locations with the first optical interface of the first optical splitter-combiner;

a second semiconductor-based optical waveguide that is arranged to optically connect the second fiber-to-chip coupling location of the at least three fiber-to-chip coupling locations with the fourth optical input port of the InP-based polarization splitter;

a third semiconductor-based optical waveguide that is arranged to optically connect the third fiber-to-chip coupling location of the at least three fiber-to-chip coupling locations with the fourth optical interface of the second optical splitter-combiner;

a fourth semiconductor-based optical waveguide that is arranged to optically connect the third optical output port of the InP-based polarization splitter with the fifth optical input port of the InP-based polarization rotator;

a fifth semiconductor-based optical waveguide that is arranged to optically connect the fourth optical output port of the InP-based polarization splitter with the fifth optical interface of the second optical splitter-combiner;

a sixth semiconductor-based optical waveguide that is arranged to optically connect the fifth optical output port of the InP-based polarization rotator with the second optical interface of the first optical splitter-combiner;

a seventh semiconductor-based optical waveguide that is arranged to optically connect the third optical interface of the first splitter-combiner with the first optical input port of the first optical receiver; and an eighth semiconductor-based optical waveguide that is arranged to optically connect the sixth optical interface of the second optical splitter-combiner with the second optical input port of the second optical receiver.

The above-defined embodiment of the PIC according to the invention can be operated in accordance with the above-described first and second exemplary use cases. Operating the above-defined embodiment of the PIC in accordance with the above-described third exemplary use case that provides a hybrid polarization handling solution is not possible because the first optical splitter-combiner is arranged between the InP-based polarization rotator of the on-chip InP-based polarization handling unit and the first optical receiver.

The person skilled in the art will appreciate that any suitable number of fiber-to-chip coupling locations of three and higher, any suitable number of InP-based polarization splitters of one and higher, any suitable number of polarization rotators of one and higher, any suitable number of optical splitter-combiners of two and higher, any suitable number of optical receivers of two and higher, and any suitable number of semiconductor-based optical waveguides can be envisaged depending on the specific requirements for the PIC.

In an embodiment of the PIC according to the invention, the first optical receiver of the at least two optical receivers has a first optical input port;

the second optical receiver of the at least two optical receivers has a second optical input port;

the first optical splitter-combiner has:

a first end part that is provided with at least a first optical interface and a second optical interface; and a second end part that is provided with at least a third optical interface;

the second optical splitter-combiner has:

a third end part that is provided with at least a fourth optical interface and a fifth optical interface; and a fourth end part that is provided with at least a sixth optical interface;

the InP-based polarization handling unit comprises:

an InP-based polarization splitter having a fourth optical input port, a third optical output port, and a fourth optical output port; and an InP-based polarization rotator having a fifth optical input port and a fifth optical output port; and the plurality of semiconductor-based optical waveguides comprises:

a first semiconductor-based optical waveguide that is arranged to optically connect the first fiber-to-chip coupling location of the at least three fiber-to-chip coupling locations with the first optical interface of the first optical splitter-combiner;

a second semiconductor-based optical waveguide that is arranged to optically connect the second fiber-to-chip coupling location of the at least three fiber-to-chip coupling locations with the fourth optical input port of the InP-based polarization splitter;

a third semiconductor-based optical waveguide that is arranged to optically connect the third fiber-to-chip coupling location of the at least three fiber-to-chip coupling locations with the fourth optical interface of the second optical splitter-combiner;

a fourth semiconductor-based optical waveguide that is arranged to optically connect the third optical output port of the InP-based polarization splitter with the second optical interface of the first optical splitter-combiner;

a fifth semiconductor-based optical waveguide that is arranged to optically connect the fourth optical output port of the InP-based polarization splitter with the fifth optical interface of the second optical splitter-combiner;

a sixth semiconductor-based optical waveguide that is arranged to optically connect the third optical interface of the first optical splitter-combiner with the fifth optical input port of the InP-based polarization rotator;

a seventh semiconductor-based optical waveguide that is arranged to optically connect the fifth optical output port of the InP-based polarization rotator with the first optical input port of the first optical receiver; and an eighth semiconductor-based optical waveguide that is arranged to optically connect the sixth optical interface of the second optical splitter-combiner with the second optical input port of the second optical receiver.

The above-defined embodiment of the PIC according to the present invention can be operated in accordance with the above-described first and third exemplary use cases. Operating the above-defined embodiment of the PIC in accordance with the above-described second exemplary use case offering a fully off-chip polarization handling solution is not possible because the InP-based polarization rotator of the on-chip InP-based polarization handling unit is arranged between the first optical splitter-combiner and the first optical receiver. Therefore, only the polarization splitting can be performed completely off-chip.

The person skilled in the art will appreciate that any suitable number of fiber-to-chip coupling locations of three and higher, any suitable number of InP-based polarization splitters of one and higher, any suitable number of polarization rotators of one and higher, any suitable number of optical splitter-combiners of two and higher, any suitable number of optical receivers of two and higher, and any suitable number of semiconductor-based optical waveguides can be envisaged depending on the specific requirements for the PIC.

In an embodiment of the PIC according to the invention, the at least two optical receivers are coherent optical receivers or configured to recover information from an optical signal that is encoded using amplitude modulation. An example of a suitable modulation format that uses amplitude modulation is On-Off-Keying (OOK).

In an embodiment of the PIC according to the invention, at least the first fiber-to-chip coupling location and the third fiber-to-chip coupling location of the at least three fiber-to-chip coupling locations are arranged apart at a distance that is in a range from 20 μm to 1000 μm, preferably in a range from 250 μm to 500 μm. The person skilled in the art will appreciate that a distance between the first fiber-to-chip coupling location and the third fiber-to-chip coupling location in the above-mentioned ranges allows simultaneous coupling of optical fibers to at least the first fiber-to-chip coupling location and the third fiber-to-chip coupling location using a fiber array or fiber block. This can contribute to an improved ease of use of the PIC according to the invention.

In an embodiment of the PIC according to the invention, the at least three fiber-to-chip coupling locations are arranged at a same facet of the PIC. This can also contribute to an improved ease of use of the PIC according to the invention.

In an embodiment of the PIC according to the invention, at least one of the at least two optical splitter-combiners is a thermally tunable optical splitter-combiner or an electro-optically tunable optical splitter-combiner. The person skilled in the art will appreciate that a thermally tunable or electro-optically tunable splitter-combiner can be used to actively optimize the coupling efficiency for a given waveguide path.

In an embodiment of the PIC according to the invention, at least one of the at least two optical splitter-combiners is a multimode interference-based, MMI-based coupler. The respective end parts of the MMI-based coupler can have any suitable number of optical interfaces. Therefore, the MMI-based coupler can be implemented as any suitable n×m MMI-based coupler, for example a 1×2 MMI-based coupler or a 2×2 MMI-based coupler. An advantage of applying a 1×2 MMI-based coupler can be that it gives equal priority to both the on-chip and off-chip polarization handling solutions offered by the PIC. This means that a fundamental 3 dB loss will be incurred for either one of these solutions. An advantage of applying a 2×2 MMI-based coupler can be that it allows additional components to be added to the PIC such as for example a semiconductor optical amplifier (SOA) and/or an additional polarization rotator. The afore-mentioned additional components can be used for example to enable at least one of improved alignment of optical fibers and fiber-to-chip coupling locations, and characterization of at least the InP-based polarization handling components of the PIC.

In an embodiment of the PIC according to the invention, the MMI-based coupler is a thermally tunable MMI-based coupler or an electro-optically tunable MMI-based coupler. Similar to what was mentioned above, it will be appreciated that a thermally tunable MMI-based coupler or an electro-optically tunable MMI-based coupler can be used to actively optimize the coupling efficiency for a given waveguide path.

In an embodiment of the PIC according to the invention, the MMI-based coupler is configured and arranged to be an asymmetric MMI-based coupler. An advantage of applying an asymmetric MMI-based coupler, for example: 85%:15%, can be that one of the waveguide paths with which the MMI-based coupler is optically connected can be favored.

In an embodiment of the PIC according to the invention, at least one of the first semiconductor-based optical waveguide at the first fiber-to-chip coupling location, the second semiconductor-based optical waveguide at the second fiber-to-chip coupling location, and the third semiconductor-based optical waveguide at the third fiber-to-chip coupling location is provided with a tapered section. The tapered section can be configured and arranged to enable spot-size conversion of optical radiation for improving coupling efficiency at the optical interface between a respective semiconductor-based optical waveguide and a respective optical fiber at a respective fiber-to-chip coupling location of the PIC according to the invention.

In an embodiment of the PIC according to the invention, at least one of the at least two optical receivers, the at least two optical splitter-combiners, and the plurality of semiconductor-based optical waveguides comprise InP-based semiconductor material.

In an embodiment of the PIC according to the invention, the PIC is a hybrid PIC or an InP-based monolithic PIC. A hybrid PIC allows the advantages of the present invention to be applied in the domain of III-V photonics as well as in the domain of silicon photonics. A hybrid PIC can comprise photonic components comprising group III-V semiconductor materials, e.g. InP-based semiconductor materials, and photonic components comprising group IV semiconductor materials, e.g. Si-based semiconductor materials, on a single die. An advantage of a hybrid PIC according to the invention can be that photonic components can be exchanged for example in the case of malfunction or breakdown. An advantage of an InP-based monolithic PIC can be that both active components such as for example light-generating and/or light-absorbing optical devices, and passive components such as for example light-guiding and/or light-switching optical devices, are integrated on the same semiconductor substrate of a single die. As a result, fabrication of an InP-based monolithic PIC can be less cumbersome and therefore can be less expensive than the assembly of a hybrid PIC that requires assembly steps for the hybrid interconnection of the active and passive opto-electronic devices each of which typically are fabricated on different substrates. In addition, an InP-based monolithic PIC can allow the PIC to have a smaller total footprint than the total footprint of a hybrid PIC.

According to another aspect of the present invention, an opto-electronic system is provided comprising a PIC according to the invention. The opto-electronic system can for example, but not exclusively, be used for telecommunication applications, LIDAR or sensor applications. The opto-electronic system can be one of a receiver, a transceiver, a coherent receiver and a coherent transceiver.

BRIEF DESCRIPTION OF THE DRAWINGS

Further features and advantages of the invention will become apparent from the description of exemplary and non-limiting embodiments of a PIC according to the present invention, and an opto-electronic system comprising such a PIC.

The person skilled in the art will appreciate that the described embodiments of the PIC and the opto-electronic system are exemplary in nature only and not to be construed as limiting the scope of protection in any way. The person skilled in the art will realize that alternatives and equivalent embodiments of the PIC and the opto-electronic system can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts.

Figure 2:
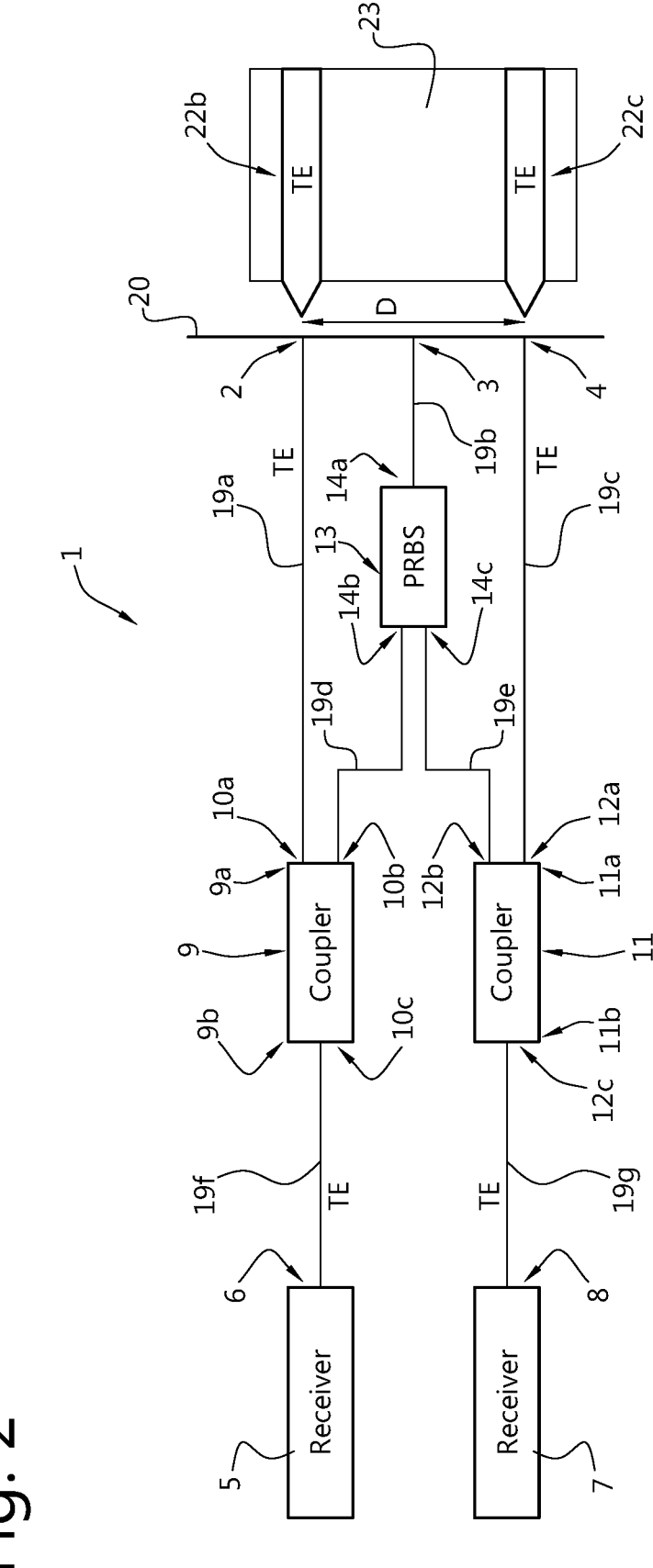
Figure 3:
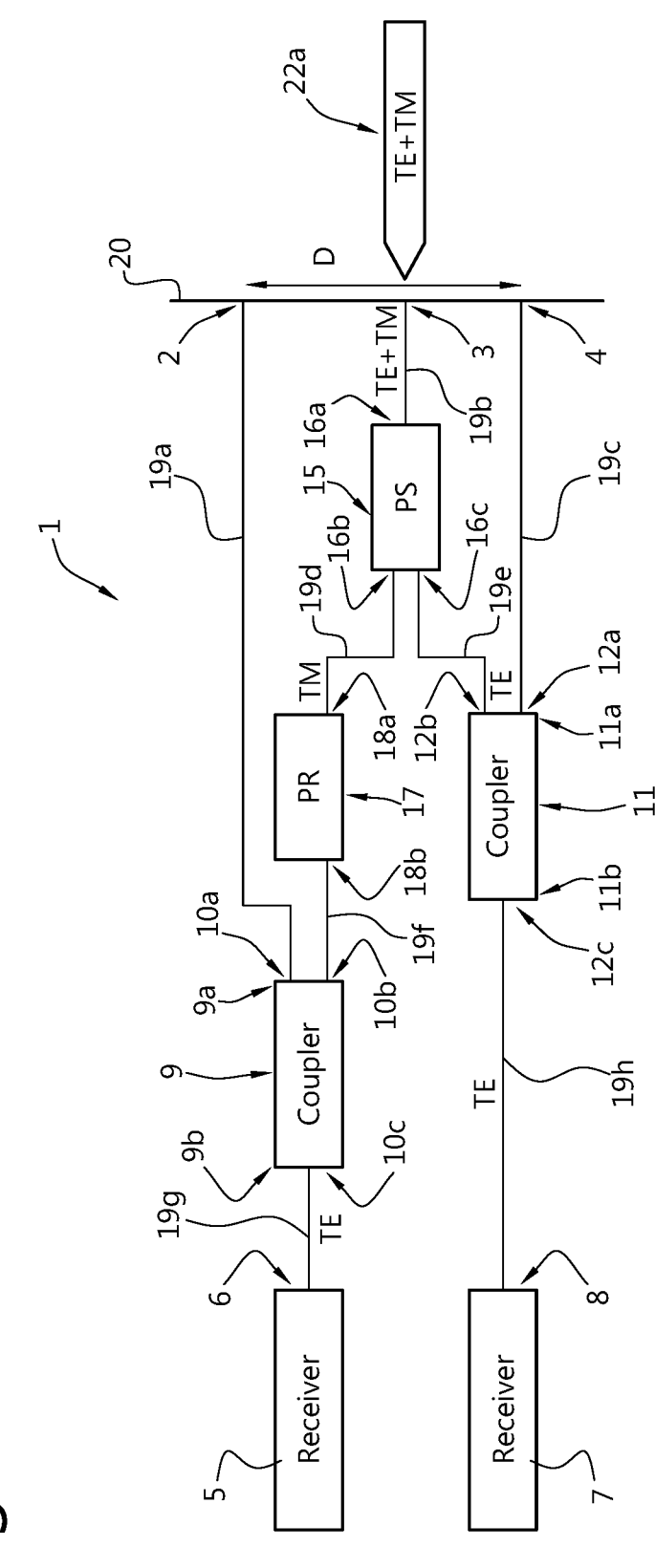
Figure 4:
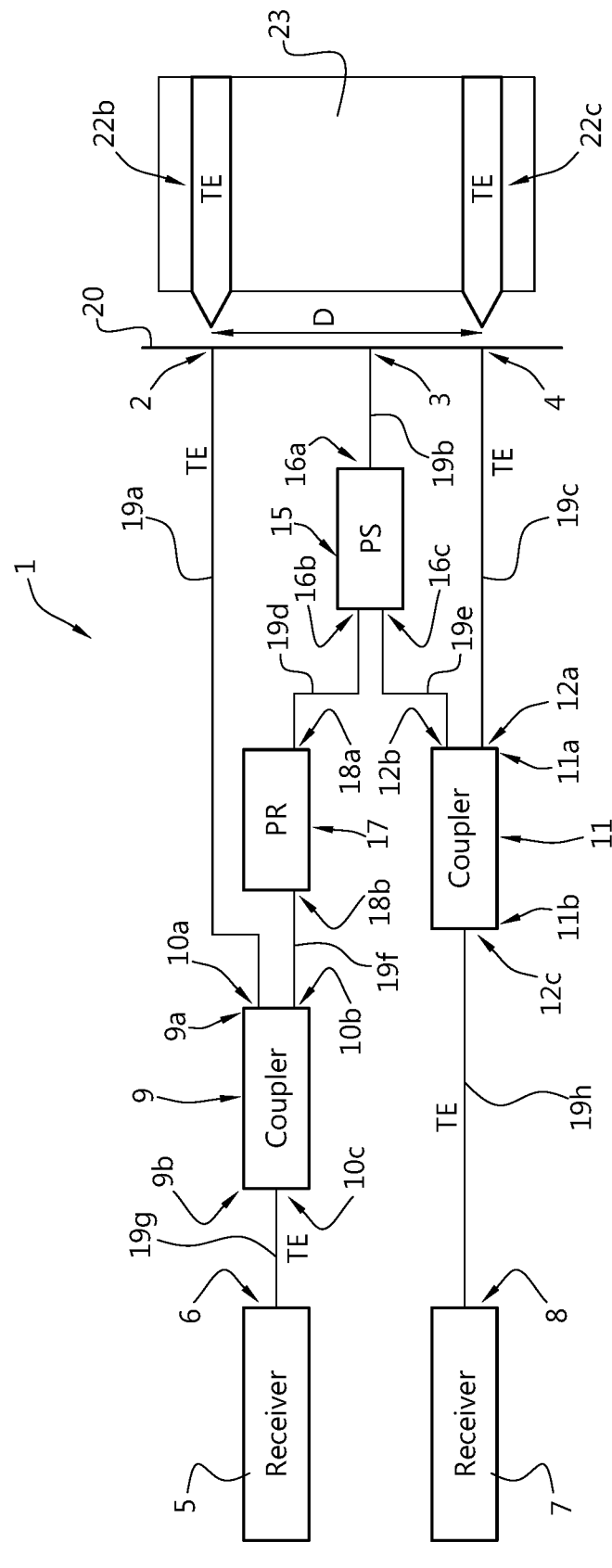
Figure 5:
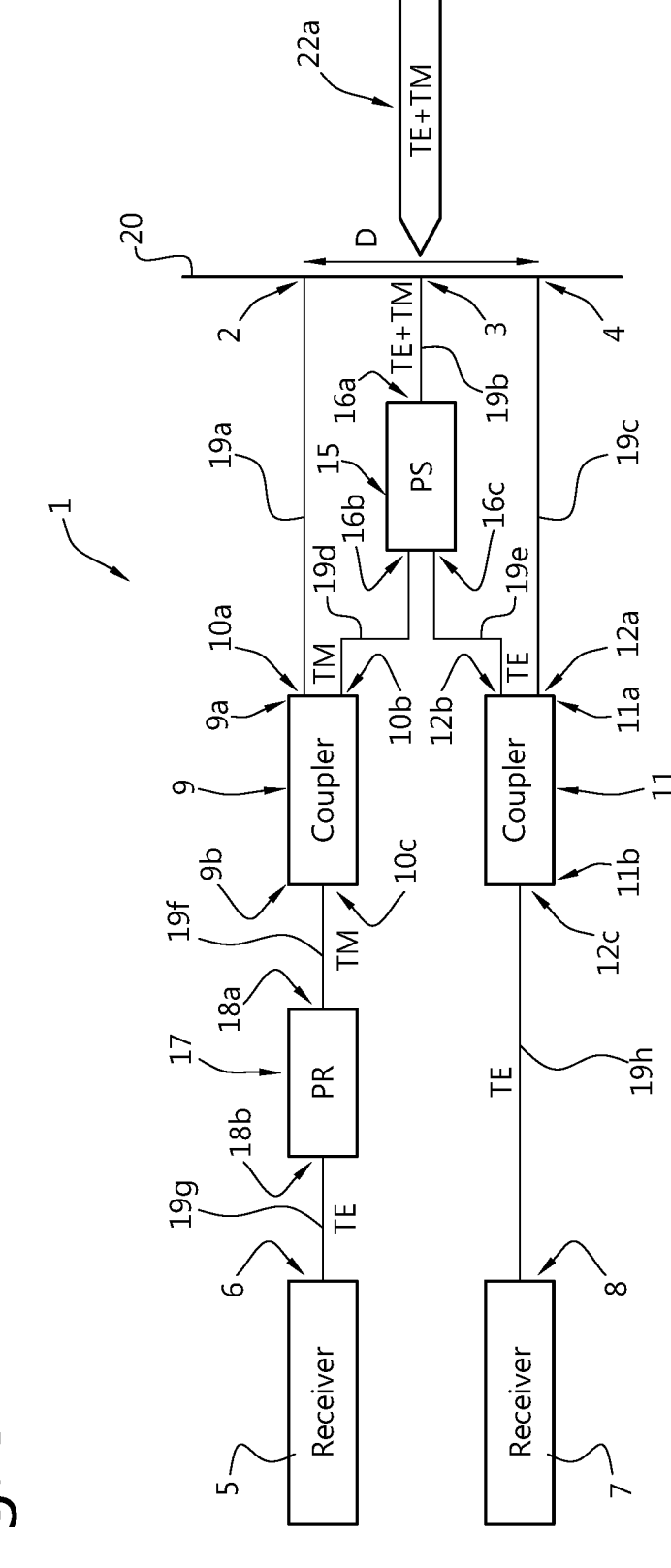
Figure 6:
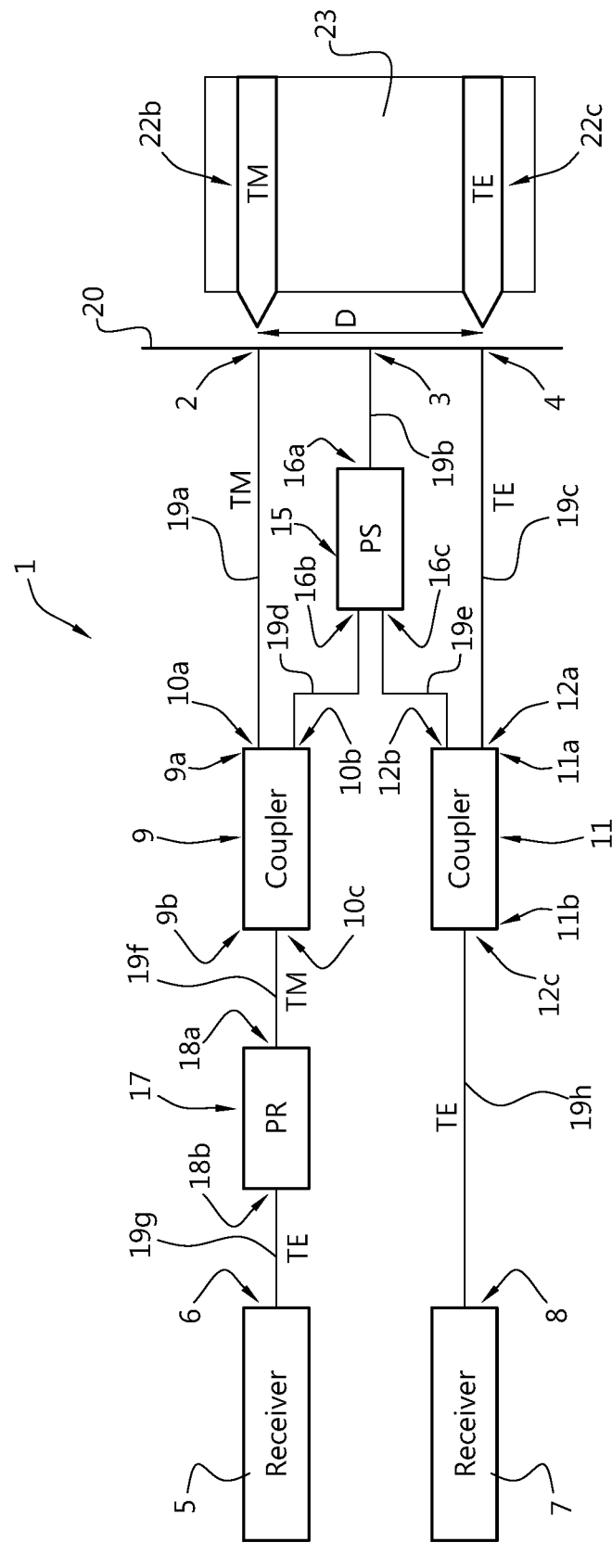
Figure 7:
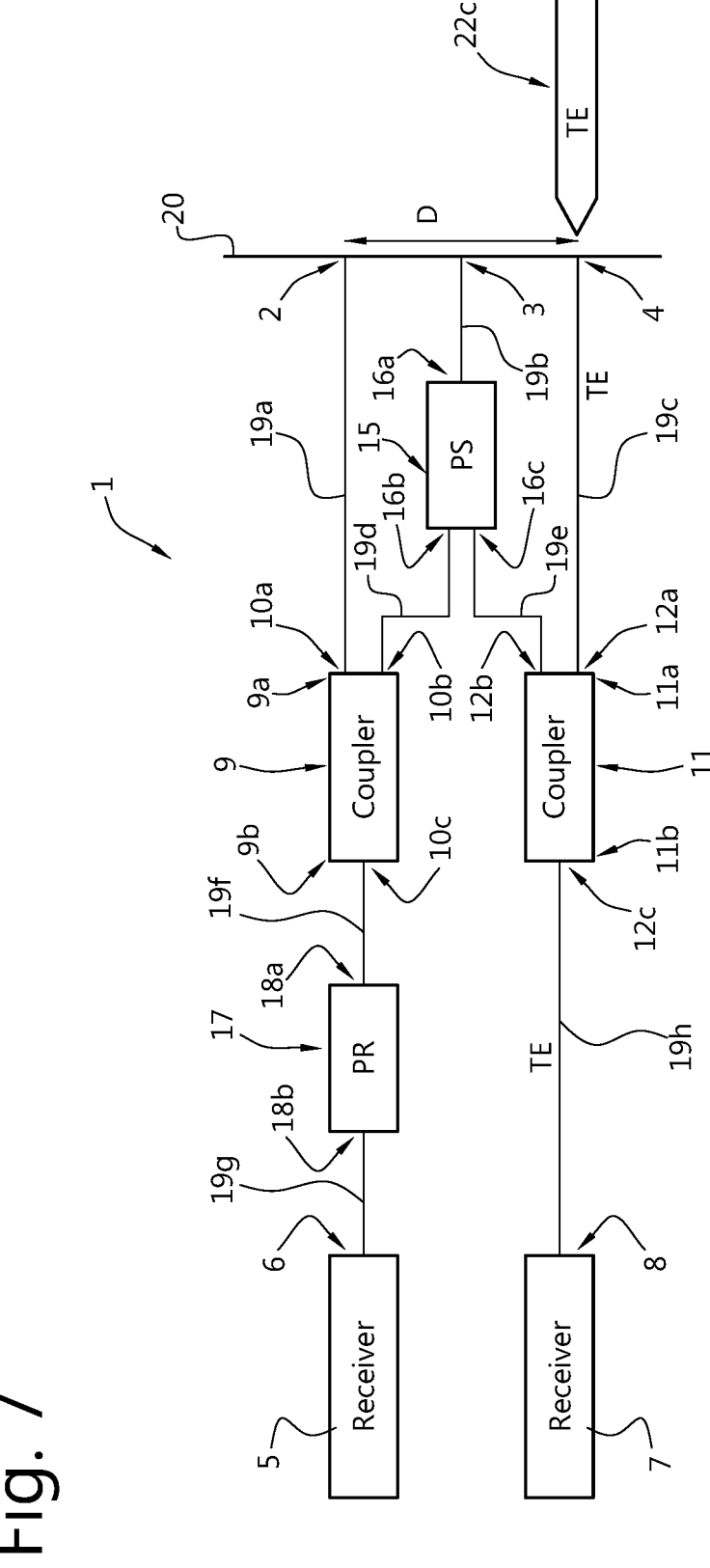
Figure 8:
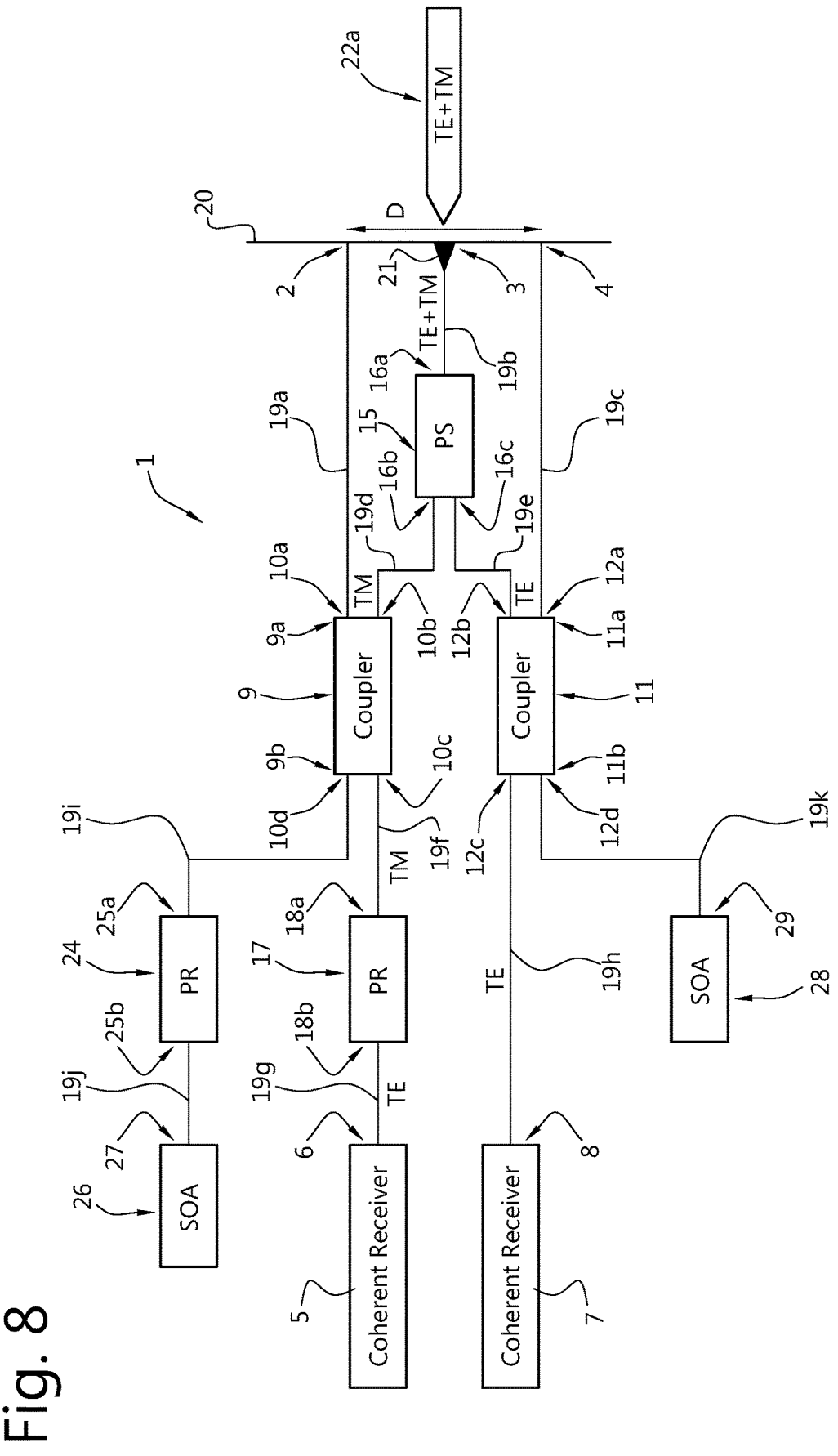
Figure 9:
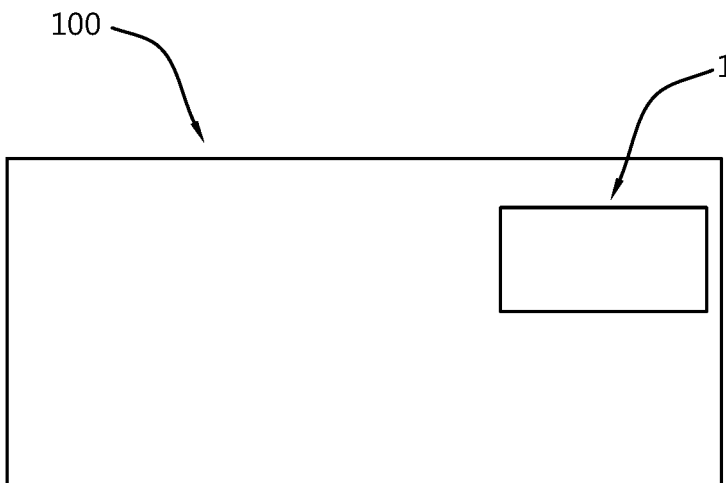

On the attached drawing sheets,

Figure 1:
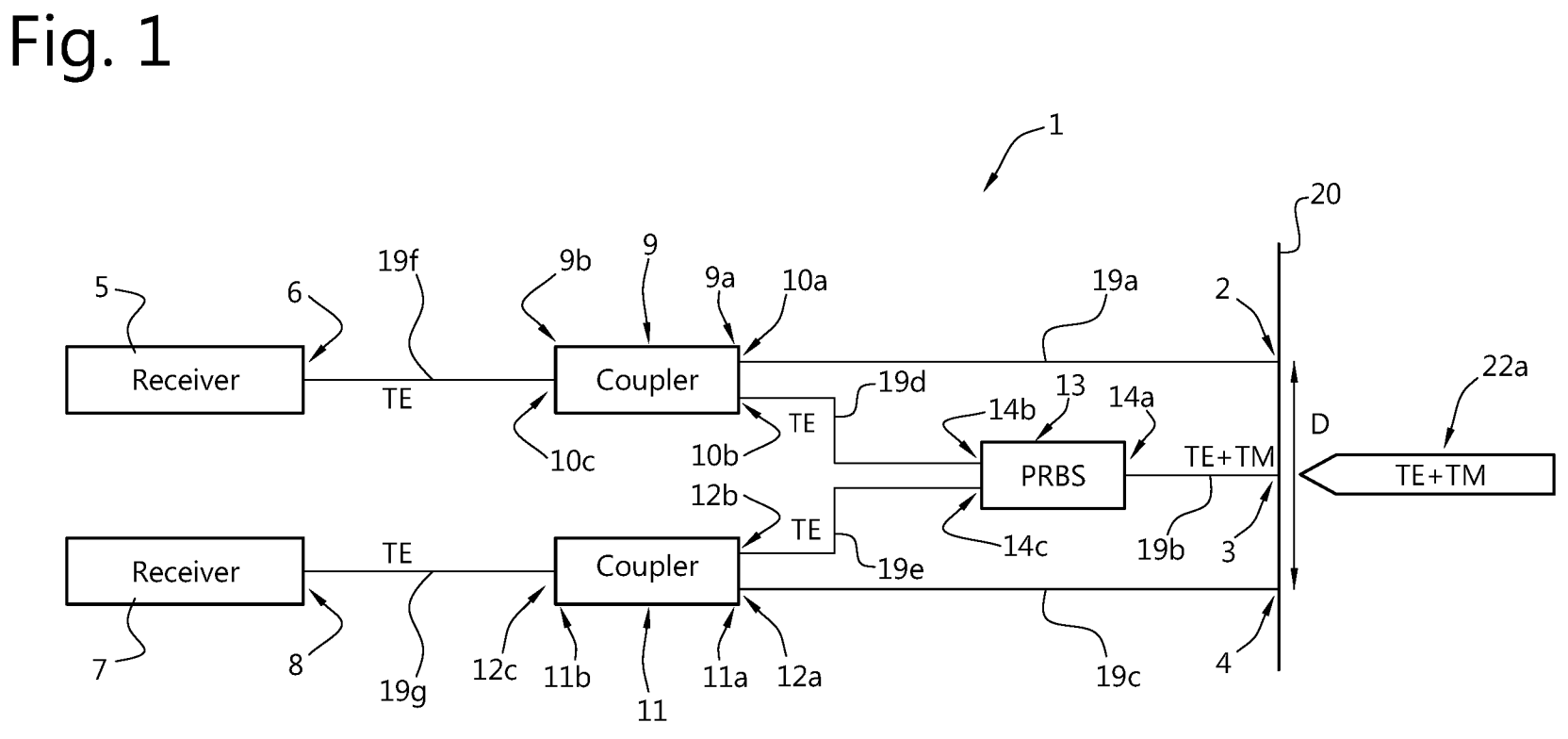

FIG. 1 shows a schematic top view of a first exemplary, non-limiting embodiment of a PIC according to the present invention that is operated in accordance with a first exemplary use case;

FIG. 2 shows a schematic top view of the first exemplary, non-limiting embodiment of the PIC according to the present invention that is operated in accordance with a second exemplary use case;

FIG. 3 shows a schematic top view of a second exemplary, non-limiting embodiment of the PIC according to the present invention that is operated in accordance with the first exemplary use case;

FIG. 4 shows a schematic top view of the second exemplary, non-limiting embodiment of the PIC according to the present invention that is operated in accordance with the second exemplary use case;

FIG. 5 shows a schematic top view of a third exemplary, non-limiting embodiment of the PIC according to the present invention that is operated in accordance with the first exemplary use case;

FIG. 6 shows a schematic top view of the third exemplary, non-limiting embodiment of the PIC according to the present invention that is operated in accordance with a third exemplary use case;

FIG. 7 shows a schematic top view of the third exemplary, non-limiting embodiment of the PIC according to the present invention that is operated in accordance with a fourth exemplary use case;

FIG. 8 shows a schematic top view of a fourth exemplary, non-limiting embodiment of the PIC according to the present invention that is operated in accordance with the first exemplary use case; and FIG. 9 shows a schematic top view of a first exemplary, non-limiting embodiment of an opto-electronic system comprising a PIC according to the present invention.

DETAILED DESCRIPTION OF EMBODIMENTS

FIG. 1 shows a schematic top view of a first exemplary, non-limiting embodiment of a PIC 1 according to the present invention. The PIC 1 comprises three fiber-to-chip coupling locations 2, 3, 4, an InP-based polarization handling unit in the form of a combined InP-based polarization splitter and rotator device 13, two optical splitter-combiners 9, 11, two optical receivers 5, 7, and a plurality of optically interconnecting semiconductor-based optical waveguides 19a-19g. A first semiconductor-based optical waveguide 19a is arranged to optically connect a first fiber-to-chip coupling location 2 with a first optical interface 10a at a first end part 9a of a first optical splitter-combiner 9. A second semiconductor-based optical waveguide 19b is arranged to optically connect a second fiber-to-chip coupling location 3 with a third optical input port 14a of the combined InP-based polarization splitter and rotator device 13. A third semiconductor-based optical waveguide 19c is arranged to optically connect a third fiber-to-chip coupling location 4 with a fourth optical interface 12a at a third end part 11a of a second optical splitter-combiner 11. A fourth semiconductor-based optical waveguide 19*d* is arranged to optically connect a first optical output port 14*b* of the combined InP-based polarization splitter and rotator device 13 with a second optical interface 10*b* at the first end part 9*a* of the first optical splitter-combiner 9. A fifth semiconductor-based optical waveguide 19*e* is arranged to optically connect a second optical output port 14*c* of the combined InP-based polarization splitter and rotator device 13 with a fifth optical interface 12*b* at the third end part 11*a* of the second optical splitter-combiner 11. A sixth semiconductor-based optical waveguide 19*f* is arranged to optically connect a third optical interface 10*c* at a second end part 9*b* of the first optical splitter-combiner 9 with a first optical input port 6 of a first optical receiver 5. A seventh semiconductor-based optical waveguide 19*g* is arranged to optically connect a sixth optical interface 12*c* at a fourth end part 11*b* of the second optical splitter-combiner 11 with a second optical input port 8 of a second optical receiver 7.

FIG. 1 shows that a first optical fiber 22*a* is optically connected with the PIC 1 at the second fiber-to-chip coupling location 3 in accordance with the above-described first exemplary use case that provides a fully on-chip polarization handling solution. In accordance with the first exemplary use case, the first optical fiber 22*a* guides optical radiation comprising both TM and TE modes that are launched into the second semiconductor-based optical waveguide 19*b* that is optically connected with the third optical input port 14*a* of the combined InP-based polarization splitter and rotator device 13. The combined InP-based polarization splitter and rotator device 13 is configured to first separate the TM and TE modes of the received optical radiation, and then rotate the separated TM mode to obtain a converted TE mode. Subsequently, the converted TE mode is guided to the first optical receiver 5 via the fourth semiconductor-based optical waveguide 19*d*, the first optical splitter-combiner 9 and the sixth semiconductor-based optical waveguide 19*f*. The separated TE mode is guided to the second optical receiver 7 via the fifth semiconductor-based optical waveguide 19*e*, the second optical splitter-combiner 11 and the seventh semiconductor-based optical waveguide 19*g*.

FIG. 2 shows a schematic top view of the first exemplary, non-limiting embodiment of the PIC 1 that is operated in accordance with the above-described second exemplary use case that provides a fully off-chip polarization handling solution. FIG. 2 shows that a second optical fiber 22*b* is optically connected with the PIC 1 at the first fiber-to-chip coupling location 2 and that a third optical fiber 22*c* is optically connected with the PIC 1 at the third fiber-to-chip coupling location 4. In accordance with the second exemplary use case, the second optical fiber 22*b* guides optical radiation comprising an off-chip separated and converted TE mode that is launched into the first semiconductor-based optical waveguide 19*a* and guided to the first optical receiver 5 via the first semiconductor-based optical waveguide 19*a*, the first optical splitter-combiner 9 and the sixth semiconductor-based optical waveguide 19*f*. In accordance with the second exemplary use case, the third optical fiber 22*c* guides optical radiation comprising an off-chip separated TE mode that is launched into the third semiconductor-based optical waveguide 19*c* and guided to the second optical receiver 7 via the third semiconductor-based optical waveguide 19*c*, the second optical splitter-combiner 11 and the seventh semiconductor-based optical waveguide 19*g*.

It will be clear that the embodiment of the PIC 1 that is shown in FIGS. 1 and 2 cannot be operated in accordance with the above-described third exemplary use case that provides a hybrid polarization handling solution because on the one hand the first optical splitter-combiner 9 is arranged between the combined InP-based polarization splitter and rotator device 13 and the first optical receiver 5, and on the other hand the second optical splitter-combiner 11 is arranged between the combined InP-based polarization splitter and rotator device 13 and the second optical receiver 7.

FIGS. 1-8 show that the first fiber-to-chip coupling location 2 and the third fiber-to-chip coupling location 4 are arranged apart at a distance D. As mentioned above, the distance D can be in a range from 20 μm to 1000 μm, preferably in a range from 250 μm to 500 μm. In this way, simultaneous coupling of the second optical fiber 22*b* to the first fiber-to-chip coupling location 2 and the third optical fiber 22*c* to the third fiber-to-chip coupling location 4 can be achieved using a fiber array or fiber block 23 (cfr. FIGS. 2, 4, 6). As mentioned above, this can contribute to an improved ease of use of the PIC 1 according to the invention.

FIGS. 1-8 also show that the three fiber-to-chip coupling locations 2, 3, 4 are arranged at a same facet 20 of the PIC 1. This can also contribute to an improved ease of use of the PIC 1.

The optical splitter-combiners 9, 11 in the embodiments of the PIC 1 shown in the FIGS. 1-8 are schematic representations of MMI-based couplers. It will be appreciated that any suitable type of optical splitter-combiners can be used in accordance with the present invention. FIGS. 1-7 show that 1×2 MMI-based couplers are used to implement the optical splitter-combiners 9, 11, whereas FIG. 8 shows that 2×2 MMI-based couplers are used to implement the optical splitter-combiners 9, 11. As mentioned above, an advantage of applying 1×2 MMI-based couplers can be that it gives equal priority to both the on-chip and off-chip polarization handling solutions offered by the PIC 1. This means that a fundamental 3 dB loss will be incurred for either one of these solutions. Advantages of applying 2×2 MMI-based couplers will be described in relation to FIG. 8.

The optical receivers 5, 7 in the embodiments of the PIC 1 shown in the FIGS. 1-8 can be implemented as coherent optical receivers or as regular optical receivers that are configured to recover information from an optical signal that is encoded using amplitude modulation. As mentioned above, an example of a suitable modulation format that uses amplitude modulation is On-Off-Keying (OOK).

FIG. 3 shows a schematic top view of a second exemplary, non-limiting embodiment of the PIC 1 according to the present invention. The PIC 1 comprises three fiber-to-chip coupling locations 2, 3, 4, an InP-based polarization handling unit comprising an InP-based polarization splitter 15 and an InP-based polarization rotator 17, two optical splitter-combiners 9, 11, two optical receivers 5, 7, and a plurality of optically interconnecting semiconductor-based optical waveguides 19*a*-19*h*. A first semiconductor-based optical waveguide 19*a* is arranged to optically connect a first fiber-to-chip coupling location 2 with a first optical interface 10*a* at a first end part 9*a* of a first optical splitter-combiner 9. A second semiconductor-based optical waveguide 19*b* is arranged to optically connect a second fiber-to-chip coupling location 3 with a fourth optical input port 16*a* of the InP-based polarization splitter 15. A third semiconductor-based optical waveguide 19*c* is arranged to optically connect a third fiber-to-chip coupling location 4 with a fourth optical interface 12*a* at a third end part 11*a* of a second optical splitter-combiner 11. A fourth semiconductor-based optical waveguide 19*d* is arranged to optically connect a third optical output port 16*b* of the InP-based polarization splitter 15 with a fifth optical input port 18*a* of the InP-based polarization rotator 17. A fifth semiconductor-based optical waveguide 19e is arranged to optically connect a fourth optical output port 16c of the InP-based polarization splitter 15 with a fifth optical interface 12b at the third end part 11a of the second optical splitter-combiner 11. A sixth semiconductor-based optical waveguide 19f is arranged to optically connect a fifth optical output port 18b of the InP-based polarization rotator 17 with a second optical interface 10b at the first end part 9a of the first optical splitter-combiner 9. A seventh semiconductor-based optical waveguide 19g is arranged to optically connect a third optical interface 10c at a second end part 9b of the first splitter-combiner 9 with a first optical input port 6 of a first optical receiver 5. An eighth semiconductor-based optical waveguide 19h is arranged to optically connect a sixth optical interface 12c at a fourth end part 11b of the second optical splitter-combiner 11 with a second optical input port 8 of a second optical receiver 7.

FIG. 3 shows that a first optical fiber 22a is optically connected with the PIC 1 at the second fiber-to-chip coupling location 3 in accordance with the above-described first exemplary use case that provides a fully on-chip polarization handling solution. In accordance with the first exemplary use case, the first optical fiber 22a guides optical radiation comprising both TM and TE modes that are launched into the second semiconductor-based optical waveguide 19b that is optically connected with the fourth optical input port 16a of the InP-based polarization splitter 15. The InP-based polarization splitter 15 is configured to separate the TM and TE modes of the received optical radiation. The separated TM mode is guided to the InP-based polarization rotator 17 via the fourth semiconductor-based optical waveguide 19d. The InP-based polarization rotator 17 is configured to rotate the separated TM mode to obtain a converted TE mode. Subsequently, the converted TE mode is guided to the first optical receiver 5 via the sixth semiconductor-based optical waveguide 19f, the first optical splitter-combiner 9 and the seventh semiconductor-based optical waveguide 19g. The separated TE mode is guided to the second optical receiver 7 via the fifth semiconductor-based optical waveguide 19e, the second optical splitter-combiner 11 and the eighth semiconductor-based optical waveguide 19h.

FIG. 4 shows a schematic top view of the second exemplary, non-limiting embodiment of the PIC 1 that is operated in accordance with the above-described second exemplary use case that provides a fully off-chip polarization handling solution. FIG. 4 shows that a second optical fiber 22b is optically connected with the PIC 1 at the first fiber-to-chip coupling location 2 and that a third optical fiber 22c is optically connected with the PIC 1 at the third fiber-to-chip coupling location 4 using a fiber array or fiber block 23. In accordance with the second exemplary use case, the second optical fiber 22b guides optical radiation comprising an off-chip separated and converted TE mode that is launched into the first semiconductor-based optical waveguide 19a and guided to the first optical receiver 5 via the first semiconductor-based optical waveguide 19a, the first optical splitter-combiner 9 and the seventh semiconductor-based optical waveguide 19g. In accordance with the second exemplary use case, the third optical fiber 22c guides optical radiation comprising an off-chip separated TE mode that is launched into the third semiconductor-based optical waveguide 19c and guided to the second optical receiver 7 via the third semiconductor-based optical waveguide 19c, the second optical splitter-combiner 11 and the eighth semiconductor-based optical waveguide 19h.

It will be clear that the embodiment of the PIC 1 that is shown in FIGS. 3 and 4 cannot be operated in accordance with the above-described third exemplary use case that provides a hybrid polarization handling solution because the first optical splitter-combiner 9 is arranged between the InP-based polarization rotator 17 and the first optical receiver 5.

FIG. 5 shows a schematic top view of a third exemplary, non-limiting embodiment of the PIC 1 according to the present invention. The PIC 1 comprises three fiber-to-chip coupling locations 2, 3, 4, an InP-based polarization handling unit comprising an InP-based polarization splitter 15 and an InP-based polarization rotator 17, two optical splitter-combiners 9, 11, two optical receivers 5, 7, and a plurality of optically interconnecting semiconductor-based optical waveguides 19a-19h. A first semiconductor-based optical waveguide 19a is arranged to optically connect the first fiber-to-chip coupling location 2 with a first optical interface 10a at a first end part 9a of a first optical splitter-combiner 9. A second semiconductor-based optical waveguide 19b is arranged to optically connect the second fiber-to-chip coupling location 3 with a fourth optical input port 16a of the InP-based polarization splitter 15. A third semiconductor-based optical waveguide 19c is arranged to optically connect the third fiber-to-chip coupling location 4 with a fourth optical interface 12a at a third end part 11a of a second optical splitter-combiner 11. A fourth semiconductor-based optical waveguide 19d is arranged to optically connect a third optical output port 16b of the InP-based polarization splitter 15 with a second optical interface 10b at the first end part 9a of the first optical splitter-combiner 9. A fifth semiconductor-based optical waveguide 19e is arranged to optically connect a fourth optical output port 16c of the InP-based polarization splitter 15 with a fifth optical interface 12b at the third end part 11a of the second optical splitter-combiner 11. A sixth semiconductor-based optical waveguide 19f is arranged to optically connect a third optical interface 10c at a second end part 9b of the first optical splitter-combiner 9 with a fifth optical input port 18a of the InP-based polarization rotator 17. A seventh semiconductor-based optical waveguide 19g is arranged to optically connect a fifth optical output port 18b of the InP-based polarization rotator 17 with a first optical input port 6 of a first optical receiver 5. An eighth semiconductor-based optical waveguide 19h is arranged to optically connect a sixth optical interface 12c at a fourth end part 11b of the second optical splitter-combiner 11 with a second optical input port 8 of a second optical receiver 7.

FIG. 5 shows that a first optical fiber 22a is optically connected with the PIC 1 at the second fiber-to-chip coupling location 3 in accordance with the above-described first exemplary use case that provides a fully on-chip polarization handling solution. In accordance with the first exemplary use case, the first optical fiber 22a guides optical radiation comprising both TM and TE modes that are launched into the second semiconductor-based optical waveguide 19b that is optically connected with the fourth optical input port 16a of the InP-based polarization splitter 15. The InP-based polarization splitter 15 is configured to separate the TM and TE modes of the received optical radiation. The separated TM mode is guided to the InP-based polarization rotator 17 via the fourth semiconductor-based optical waveguide 19d, the first optical splitter-combiner 9 and the sixth semiconductor-based optical waveguide 19f. The InP-based polarization rotator 17 is configured to rotate the separated TM mode to obtain a converted TE mode. Subsequently, the converted TE mode is guided to the first optical receiver 5 via the seventh semiconductor-based optical waveguide 19g. The separated TE mode is guided to the second optical receiver 7 via the fifth semiconductor-based optical waveguide 19e, the second optical splitter-combiner 11 and the eighth semiconductor-based optical waveguide 19h.

FIG. 6 shows a schematic top view of the third exemplary, non-limiting embodiment of the PIC 1 that is operated in accordance with the above-described third exemplary use case that provides a hybrid polarization handling solution. FIG. 6 shows that a second optical fiber 22b is optically connected with the PIC 1 at the first fiber-to-chip coupling location 2 and that a third optical fiber 22c is optically connected with the PIC 1 at the third fiber-to-chip coupling location 4 using a fiber array or fiber block 23. In accordance with the third exemplary use case, the second optical fiber 22b guides optical radiation comprising an off-chip separated TM mode that is launched into the first semiconductor-based optical waveguide 19a and guided to the InP-based polarization rotator 17 via the first semiconductor-based optical waveguide 19a, the first optical splitter-combiner 9 and the sixth semiconductor-based optical waveguide 19f. The InP-based polarization rotator 17 is configured to rotate the separated TM mode to obtain a converted TE mode. Subsequently, the converted TE mode is guided to the first optical receiver 5 via the seventh semiconductor-based optical waveguide 19g. In accordance with the third exemplary use case, the third optical fiber 22c guides optical radiation comprising an off-chip separated TE mode that is launched into the third semiconductor-based optical waveguide 19c and guided to the second optical receiver 7 via the third semiconductor-based optical waveguide 19c, the second optical splitter-combiner 11 and the eighth semiconductor-based optical waveguide 19h.

It will be clear that the embodiment of the PIC 1 that is shown in FIGS. 5 and 6 cannot be operated in accordance with the above-described second exemplary use case that provides a fully off-chip polarization handling solution because the InP-based polarization rotator 17 is arranged between the first optical splitter-combiner 9 and the first optical receiver 5. Therefore, only the polarization splitting can be performed completely off-chip.

FIG. 7 shows a schematic top view of the third exemplary, non-limiting embodiment of the PIC 1 that is operated in accordance with a fourth exemplary use case that provides a single polarization handling solution. Similar to common practice employed by large-scale electronic chip providers that design a single fully functional chip which is then inhibited to varying degrees during assembly to create a spectrum of products, such as for example phone processors, the PIC 1 according to the present invention can be used in single polarization mode without for example suffering from optical insertion loss that is associated with the InP-based polarization splitter 15.

FIG. 7 shows that a third optical fiber 22c is optically connected with the PIC 1 at the third fiber-to-chip coupling location 4. In accordance with the fourth exemplary use case, the third optical fiber 22c guides optical radiation comprising only a TE mode that is launched into the third semiconductor-based optical waveguide 19c and guided to the second optical receiver 7 via the third semiconductor-based optical waveguide 19c, the second optical splitter-combiner 11 and the eighth semiconductor-based optical waveguide 19h. It will be appreciated that the embodiments of the PIC 1 that are shown in FIGS. 1-4 and 8 can also be operated in accordance with the above-defined fourth exemplary use case.

It is noted that in the context of PICs that comprise InP-based components, such as at least one of an optical receiver, an optical splitter-combiner and a semiconductor-based optical waveguide, that are commonly optimized for handling TE modes due to the confined nature of quantum wells, a fifth exemplary use case in accordance with which the optical radiation comprises only a TM mode is not likely. However, PICs that do not comprise InP-based components can be operated in accordance with such fifth exemplary use case.

FIG. 8 shows a schematic top view of a fourth exemplary, non-limiting embodiment of the PIC 1 according to the present invention. The PIC 1 comprises three fiber-to-chip coupling locations 2, 3, 4, an InP-based polarization handling unit comprising an InP-based polarization splitter 15, an InP-based polarization rotator 17 and an additional InP-based polarization rotator 24, two optical splitter-combiners 9, 11, two semiconductor optical amplifiers (SOAs) 26, 28, two optical receivers 5, 7, and a plurality of optically interconnecting semiconductor-based optical waveguides 19a-19k. A first semiconductor-based optical waveguide 19a is arranged to optically connect the first fiber-to-chip coupling location 2 with a first optical interface 10a at a first end part 9a of a first optical splitter-combiner 9. A second semiconductor-based optical waveguide 19b is arranged to optically connect the second fiber-to-chip coupling location 3 with a fourth optical input port 16a of the InP-based polarization splitter 15. The second semiconductor-based optical waveguide 19b is provided with a tapered section 21 that is arranged at the second fiber-to-chip coupling location 3. The tapered section 21 can be configured and arranged to enable spot-size conversion of optical radiation for improving coupling efficiency at the optical interface between the second semiconductor-based optical waveguide 19b and the first optical fiber 22a at the second fiber-to-chip coupling location 3. It will be appreciated that in accordance with other exemplary embodiments of the PIC any one of the first semiconductor-based optical waveguide 19a, the second semiconductor-based optical waveguide 19b and the third semiconductor-based optical waveguide 19c can be provided with a tapered section. A third semiconductor-based optical waveguide 19c is arranged to optically connect the third fiber-to-chip coupling location 4 with a fourth optical interface 12a at a third end part 11a of a second optical splitter-combiner 11. A fourth semiconductor-based optical waveguide 19d is arranged to optically connect a third optical output port 16b of the InP-based polarization splitter 15 with a second optical interface 10b at the first end part 9a of the first optical splitter-combiner 9. A fifth semiconductor-based optical waveguide 19e is arranged to optically connect a fourth optical output port 16c of the InP-based polarization splitter 15 with a fifth optical interface 12b at the third end part 11a of the second optical splitter-combiner 11. A sixth semiconductor-based optical waveguide 19f is arranged to optically connect a third optical interface 10c at a second end part 9b of the first optical splitter-combiner 9 with a fifth optical input port 18a of the InP-based polarization rotator 17. A seventh semiconductor-based optical waveguide 19g is arranged to optically connect a fifth optical output port 18b of the InP-based polarization rotator 17 with a first optical input port 6 of a first optical receiver 5. An eighth semiconductor-based optical waveguide 19h is arranged to optically connect a sixth optical interface 12c at a fourth end part 11b of the second optical splitter-combiner 11 with a second optical input port 8 of a second optical receiver 7. A ninth semiconductor-based optical waveguide 19i is arranged to optically connect a fourth optical interface 10*d* at the second end part 9*b* of the first optical splitter-combiner 9 with a sixth optical input port 25*a* of the additional InP-based polarization rotator 24. A tenth semiconductor-based optical waveguide 19*j* is arranged to optically connect a sixth optical output port 25*b* of the additional InP-based polarization rotator 24 with a seventh optical input port 27 of a first SOA 26. An eleventh semiconductor-based optical waveguide 19*k* is arranged to optically connect a seventh optical interface 12*d* at the fourth end part 11*b* of the second optical splitter-combiner 11 with an eighth optical input port 29 of a second SOA 28.

FIG. 8 shows that a first optical fiber 22*a* is optically connected with the PIC 1 at the second fiber-to-chip coupling location 3 in accordance with the above-described first exemplary use case that provides a fully on-chip polarization handling solution. In accordance with the first exemplary use case, the first optical fiber 22*a* guides optical radiation comprising both TM and TE modes that are launched into the second semiconductor-based optical waveguide 19*b* that is optically connected with the fourth optical input port 16*a* of the InP-based polarization splitter 15. The InP-based polarization splitter 15 is configured to separate the TM and TE modes of the received optical radiation. The separated TM mode is guided to the InP-based polarization rotator 17 via the fourth semiconductor-based optical waveguide 19*d*, the first optical splitter-combiner 9 and the sixth semiconductor-based optical waveguide 19*f*. The InP-based polarization rotator 17 is configured to rotate the separated TM mode to obtain a converted TE mode. Subsequently, the converted TE mode is guided to the first optical receiver 5 via the seventh semiconductor-based optical waveguide 19*g*. The separated TE mode is guided to the second optical receiver 7 via the fifth semiconductor-based optical waveguide 19*e*, the second optical splitter-combiner 11 and the eighth semiconductor-based optical waveguide 19*h*.

The first optical splitter-combiner 9 and the second optical splitter-combiner 11 are schematic representations of 2×2 MMI-based couplers. Implementing the first optical splitter-combiner 9 and the second optical splitter-combiner 11 as 2×2 MMI-based couplers allows addition of additional components to the PIC 1, i.e. the additional InP-based polarization rotator 24, the first SOA 26 and the second SOA 28, as compared to the embodiments of the PIC 1 shown in the FIGS. 1-7. The afore-mentioned additional components can be used for example to enable at least one of characterization of at least the InP-based polarization handling components of the PIC 1 and an improved alignment of optical fibers and fiber-to-chip coupling locations. Optically coupling optical fibers to the fiber-to-chip coupling locations can be a challenging and time-consuming process. Forward biasing the first SOA 26 and the second SOA 28 would result in optical radiation as a result of spontaneous emission being emitted from the fiber-to-chip coupling locations 2, 3, 4 at the facet 20 of the PIC 1. This could improve initial alignment of the first optical fiber 22*a* and the third fiber-to-chip coupling location 3. Similarly, by reverse-biasing at least one of the first SOA 26 and the second SOA 28, on-chip optical power monitoring can be achieved which can enable on-chip characterization of at least the InP-based polarization handling components of the PIC 1.

FIG. 9 shows a schematic top view of a first exemplary, non-limiting embodiment of an opto-electronic system 100 comprising a PIC 1 according to the present invention. The opto-electronic system 100 can for example, but not exclusively, be used for telecommunication applications, LIDAR or sensor applications. The opto-electronic system 100 can for example be one of a receiver, a transceiver, a coherent receiver and a coherent transceiver.

The present invention can be summarized as relating to a PIC 1 comprising at least three fiber-to-chip coupling locations 2, 3, 4, an InP-based polarization handling unit, at least two optical splitter-combiners 9, 11, at least two optical receivers 5, 7, and a plurality of semiconductor-based optical waveguides. The plurality of semiconductor-based optical waveguides are configured and arranged to optically connect a first fiber-to-chip coupling location 2 with a first optical receiver 5 via a first optical splitter-combiner 9, a second fiber-to-chip coupling location 3 with the at least two optical receivers 5, 7 via the InP-based polarization handling unit and the at least two optical splitter-combiners 9, 11, and a third fiber-to-chip coupling location 4 with a second optical receiver 7 via a second optical splitter-combiner 11. The invention also relates to an opto-electronic system 100 comprising said PIC 1.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

What is claimed is:

1. A photonic integrated circuit, PIC, comprising:
at least three fiber-to-chip coupling locations;
an InP-based polarization handling unit;
at least two optical splitter-combiners;
at least two optical receivers; and
a plurality of semiconductor-based optical waveguides;
wherein the plurality of semiconductor-based optical waveguides are configured and arranged to optically connect:
a first fiber-to-chip coupling location of the at least three fiber-to-chip coupling locations with a first optical receiver of the at least two optical receivers via a first optical splitter-combiner of the at least two optical splitter-combiners;
a second fiber-to-chip coupling location of the at least three fiber-to-chip coupling locations with the at least two optical receivers via the InP-based polarization handling unit and the at least two optical splitter-combiners; and
a third fiber-to-chip coupling location of the at least three fiber-to-chip coupling locations with a second optical receiver of the at least two optical receivers via a second optical splitter-combiner of the at least two optical splitter-combiners; and wherein the first optical receiver of the at least two optical receivers has a first optical input port;

the second optical receiver of the at least two optical receivers has a second optical input port;

the first optical splitter-combiner has;

a first end part that is provided with at least a first optical interface and a second optical interface; and a second end part that is provided with at least a third optical interface;

the second optical splitter-combiner has:

a third end part that is provided with at least a fourth optical interface and a fifth optical interface; and a fourth end part that is provided with at least a sixth optical interface;

the InP-based polarization handling unit comprises a combined InP-based polarization splitter and rotator device having a third optical input port, a first optical output port and a second optical output port; and the plurality of semiconductor-based optical waveguides comprises:

a first semiconductor-based optical waveguide that is arranged to optically connect the first fiber-to-chip coupling location of the at least three fiber-to-chip coupling locations with the first optical interface of the first optical splitter-combiner;

a second semiconductor-based optical waveguide that is arranged to optically connect the second fiber-to-chip coupling location of the at least three fiber-to-chip coupling locations with the third optical input port of the combined InP-based polarization splitter and rotator device;

a third semiconductor-based optical waveguide that is arranged to optically connect the third fiber-to-chip coupling location of the at least three fiber-to-chip coupling locations with the fourth optical interface of the second optical splitter-combiner;

a fourth semiconductor-based optical waveguide that is arranged to optically connect the first optical output port of the combined InP-based polarization splitter and rotator device with the second optical interface of the first optical splitter-combiner:

a fifth semiconductor-based optical waveguide that is arranged to optically connect the second optical output port of the combined InP-based polarization splitter and rotator device with the fifth optical interface of the second optical splitter-combiner;

a sixth semiconductor-based optical waveguide that is arranged to optically connect the third optical interface of the first optical splitter-combiner with the first optical input port of the first optical receiver; and a seventh semiconductor-based optical waveguide that is arranged to optically connect the sixth optical interface of the second optical splitter-combiner with the second optical input port of the second optical receiver.

2. The PIC according to claim 1, wherein the at least two optical receivers are:

coherent optical receivers; or configured to recover information from an optical signal that is encoded using amplitude modulation.

3. The PIC according to claim 1, wherein at least the first fiber-to-chip coupling location and the third fiber-to-chip coupling location of the at least three fiber-to-chip coupling locations are arranged apart at a distance, D, that is in a range from 20 μm to 1000 μm.

4. The PIC according to claim 1, wherein at least the first fiber-to-chip coupling location and the third fiber-to-chip coupling location of the at least three fiber-to-chip coupling locations are arranged apart at a distance, D, that is in a range from 250 μm to 500 μm.

5. The PIC according to claim 1, wherein the at least three fiber-to-chip coupling locations are arranged at a same facet of the PIC.

6. The PIC according to claim 1, wherein at least one of the at least two optical splitter-combiners is a thermally tunable optical splitter-combiner or an electro-optically tunable optical splitter-combiner.

7. The PIC according to claim 1, wherein at least one of the at least two optical splitter-combiners is a multimode interference-based, MMI-based coupler.

8. The PIC according to claim 7, wherein the MMI-based coupler is a thermally tunable MMI-based coupler or an electro-optically tunable MMI-based coupler.

9. The PIC according to claim 8, wherein the MMI-based coupler is configured and arranged to be an asymmetric MMI-based coupler.

10. The PIC according to claim 7, wherein the MMI-based coupler is configured and arranged to be an asymmetric MMI-based coupler.

11. The PIC according to claim 1, wherein at least one of the first semiconductor-based optical waveguide at the first fiber-to-chip coupling location, the second semiconductor-based optical waveguide at the second fiber-to-chip coupling location, and the third semiconductor-based optical waveguide at the third fiber-to-chip coupling location is provided with a tapered section.

12. The PIC according to claim 1, wherein at least one of the at least two optical receivers, the at least two optical splitter-combiners, and the plurality of semiconductor-based optical waveguides comprise InP-based semiconductor material.

13. The PIC according to claim 1, wherein the PIC is a hybrid PIC or an InP-based monolithic PIC.

14. An opto-electronic system comprising a PIC according to claim 1.

15. A photonic integrated circuit, PIC, comprising:

at least three fiber-to-chip coupling locations;

an InP-based polarization handling unit;

at least two optical splitter-combiners;

at least two optical receivers; and a plurality of semiconductor-based optical waveguides;

wherein the plurality of semiconductor-based optical waveguides are configured and arranged to optically connect:

a first fiber-to-chip coupling location of the at least three fiber-to-chip coupling locations with a first optical receiver of the at least two optical receivers via a first optical splitter-combiner of the at least two optical splitter-combiners;

a second fiber-to-chip coupling location of the at least three fiber-to-chip coupling locations with the at least two optical receivers via the InP-based polarization handling unit and the at least two optical splitter-combiners; and a third fiber-to-chip coupling location of the at least three fiber-to-chip coupling locations with a second optical receiver of the at least two optical receivers via a second optical splitter-combiner of the at least two optical splitter-combiners; and wherein:

the first optical receiver of the at least two optical receivers has a first optical input port;

the second optical receiver of the at least two optical receivers has a second optical input port;
the first optical splitter-combiner has:
a first end part that is provided with at least a first optical interface and a second optical interface; and
a second end part that is provided with at least a third optical interface;
the second optical splitter-combiner has:
a third end part that is provided with at least a fourth optical interface and a fifth optical interface; and
a fourth end part that is provided with at least a sixth optical interface;
the InP-based polarization handling unit comprises:
an InP-based polarization splitter having a fourth optical input port, a third optical output port, and a fourth optical output port; and
an InP-based polarization rotator having a fifth optical input port and a fifth optical output port; and
the plurality of semiconductor-based optical waveguides comprises:
a first semiconductor-based optical waveguide that is arranged to optically connect the first fiber-to-chip coupling location of the at least three fiber-to-chip coupling locations with the first optical interface of the first optical splitter-combiner;
a second semiconductor-based optical waveguide that is arranged to optically connect the second fiber-to-chip coupling location of the at least three fiber-to-chip coupling locations with the fourth optical input port of the InP-based polarization splitter;

a third semiconductor-based optical waveguide that is arranged to optically connect the third fiber-to-chip coupling location of the at least three fiber-to-chip coupling locations with the fourth optical interface of the second optical splitter-combiner;
a fourth semiconductor-based optical waveguide that is arranged to optically connect the third optical output port of the InP-based polarization splitter with the fifth optical input port of the InP-based polarization rotator;
a fifth semiconductor-based optical waveguide that is arranged to optically connect the fourth optical output port of the InP-based polarization splitter with the fifth optical interface of the second optical splitter-combiner;
a sixth semiconductor-based optical waveguide that is arranged to optically connect the fifth optical output port of the InP-based polarization rotator with the second optical interface of the first optical splitter-combiner;
a seventh semiconductor-based optical waveguide that is arranged to optically connect the third optical interface of the first splitter-combiner with the first optical input port of the first optical receiver; and
an eighth semiconductor-based optical waveguide that is arranged to optically connect the sixth optical interface of the second optical splitter-combiner with the second optical input port of the second optical receiver.

* * * * *